United States Patent
Zhang et al.

(10) Patent No.: US 12,479,497 B2
(45) Date of Patent: Nov. 25, 2025

(54) LOWER ROTOR ASSEMBLIES FOR TORQUE SENSORS

(71) Applicant: Steering Solutions IP Holding Corporation, Saginaw, MI (US)

(72) Inventors: Rong (Jason) Zhang, Jiangsu (CN);
Keyi (Michael) He, Jiangsu (CN);
Fusong (Stuart) Zhao, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 856 days.

(21) Appl. No.: 17/720,839

(22) Filed: Apr. 14, 2022

(65) Prior Publication Data

US 2023/0278621 A1 Sep. 7, 2023

(51) Int. Cl.
*G01L 5/22* (2006.01)
*B62D 5/04* (2006.01)
*B62D 15/02* (2006.01)

(52) U.S. Cl.
CPC ............ *B62D 5/0403* (2013.01); *G01L 5/221* (2013.01); *B62D 15/0215* (2013.01)

(58) Field of Classification Search
CPC .... B62D 5/0403; B62D 15/0215; B62D 6/10; B62D 15/02; G01L 5/221; G01L 3/104; G01L 3/02
See application file for complete search history.

(56) References Cited

U.S. PATENT DOCUMENTS

| | | | | |
|---|---|---|---|---|
| 8,375,810 B2* | 2/2013 | Bae | ............................ | G01L 3/10 73/862.334 |
| 10,067,015 B2* | 9/2018 | Lee | ............................ | G01L 5/22 |
| 10,345,166 B2* | 7/2019 | Woo | ........................ | B62D 6/10 |
| 10,814,909 B2* | 10/2020 | Yang | ........................ | G01B 7/06 |
| 11,958,555 B2* | 4/2024 | Lee | ........................... | G01L 5/221 |
| 2010/0244606 A1* | 9/2010 | Kim | ....................... | H02K 15/12 29/598 |
| 2010/0319466 A1* | 12/2010 | Bae | ........................ | G01L 3/104 73/862.325 |

FOREIGN PATENT DOCUMENTS

| | | |
|---|---|---|
| CN | 214506827 U | 10/2021 |
| DE | 102013006567 A1 | 10/2014 |
| DE | 102016110774 A1 | 12/2017 |
| EP | 2181314 B1 | 12/2013 |
| EP | 2618122 B1 | 6/2019 |
| EP | 3241721 B1 | 2/2020 |

OTHER PUBLICATIONS

English translation of Office Action regarding corresponding DE App. No. 10 2022 110 648.9; issued Feb. 3, 2023.

* cited by examiner

*Primary Examiner* — Freddie Kirkland, III
(74) *Attorney, Agent, or Firm* — Dickinson Wright PLLC

(57) ABSTRACT

A lower rotor assembly for a torque sensor includes a lower rotor over-mold including at least one heat staking structure extending from an upper surface thereof. The lower rotor assembly further includes a lower stator integrally formed with the lower rotor over-mold as a single, unitary component. The lower rotor assembly also includes an upper stator including at least one receiving structure, where each receiving structure receives a respective heat staking structure of the lower rotor over-mold when the upper stator is coupled to the lower stator.

12 Claims, 5 Drawing Sheets

LOWER ROTOR ASSEMBLIES FOR TORQUE SENSORS

CROSS REFERENCE TO RELATED APPLICATION

This application claims priority to Chinese Patent Application No. 2022101931753, filed Mar. 1, 2022, the disclosure of which is incorporated by reference herein in its entirety.

TECHNICAL FIELD

The present disclosure relates to lower rotor assemblies for torque sensors and, more particularly, a lower rotor assembly for a torque sensor in an electric power steering (EPS) system of a vehicle.

BACKGROUND

An electric power steering (EPS) system is used to supplement a steering torque input that an operator of a vehicle applies to a steering wheel of the vehicle. The EPS system has a controller (e.g. an electronic control unit) which calculates an assist force needed based on the steering torque input, a steering wheel position, and a speed of the vehicle. The EPS system also has an electric motor that rotates a steering gear with the calculated assist force to control vehicle steering operations, thereby providing an improved steering experience to the operator.

A conventional method of assembling a lower rotor assembly requires an insertion of a probe housing assembly (PHA) into a lower rotor before the PHA and the lower rotor are pressed to a shoulder of a lower assist shaft in the EPS system. The PHA may include a plastic member and a printed circuit board (PCB) coupled to the plastic member. When the PHA and the lower rotor are positioned at the shoulder of the lower assist shaft, screws or the like may be used to mount the PHA onto an assist housing of the EPS system so as to secure the lower rotor onto the assist housing.

This method, however, has several drawbacks. First, the PHA needs to be inserted into the lower rotor before the lower rotor is pressed to the shoulder of the lower assist shaft. Second, after the PHA is inserted into the lower rotor, the PHA and the lower rotor are pressed together to the shoulder of the lower assist shaft. This process requires the use of additional tools to hold the PHA in place, making it difficult to clamp an integrated controller circuit card assembly (CCA) with the assist housing. Third, since the PHA is inserted into the lower rotor before the lower rotor is pressed to the shoulder of the lower assist shaft, an air gap between the PHA and the lower rotor may be difficult to control, and a press load of the PHA may also be difficult to detect. Therefore, there is a need to improve the method of assembling the lower rotor assembly.

SUMMARY

According to one embodiment, a lower rotor assembly for a torque sensor is disclosed. The lower rotor assembly may include a lower rotor over-mold including at least one heat staking structure extending from an upper surface thereof. The lower rotor assembly may further include a lower stator integrally formed with the lower rotor over-mold as a single, unitary component. The lower rotor assembly may also include an upper stator including at least one receiving structure, wherein each receiving structure receives a respective heat staking structure of the lower rotor over-mold when the upper stator is coupled to the lower stator.

According to another embodiment, a lower rotor assembly for a torque sensor is disclosed. The lower rotor assembly may include a lower rotor over-mold including at least one first heat staking structure extending from an upper surface thereof and at least one second heat staking structure extending from the upper surface thereof. The lower rotor assembly may further include a lower stator integrally formed with the lower rotor over-mold as a single, unitary component. The lower rotor assembly may also include an upper stator. The upper stator may further include at least one first receiving structure, wherein each first receiving structure receives a respective first heat staking structure of the lower rotor over-mold when the upper stator is coupled to the lower stator. The upper stator may also include at least one second receiving structure, wherein each second receiving structure receives a respective second heat staking structure of the lower rotor over-mold when the upper stator is coupled to the lower stator.

According to yet another embodiment, a method of assembling a lower rotor assembly for a torque sensor of an electric power steering (EPS) system is disclosed. The method may include pressing a lower rotor over-mold and a lower stator integrally formed therewith together to a shoulder of a lower assist shaft of the EPS system. The lower rotor over-mold may include at least one first heat staking structure extending from an upper surface thereof. The method may further include placing a probe housing assembly (PHA) onto a surface of the lower stator when the lower stator and the lower rotor over-mold are positioned at the shoulder of the lower assist shaft of the EPS system. The method may also include mounting the PHA onto an assist housing of the EPS system. The method may further include coupling an upper stator onto the lower stator. The upper stator may include at least one first receiving structure, wherein each first receiving structure receives a respective first heat staking structure of the lower rotor over-mold when the upper stator is coupled to the lower stator. The method may also include heating the at least one first heat staking structure of the lower rotor over-mold to join the upper stator with the lower rotor over-mold. The method may further include cooling the lower rotor over-mold, the lower stator, and the upper stator, resulting in the assembling of the lower rotor assembly.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
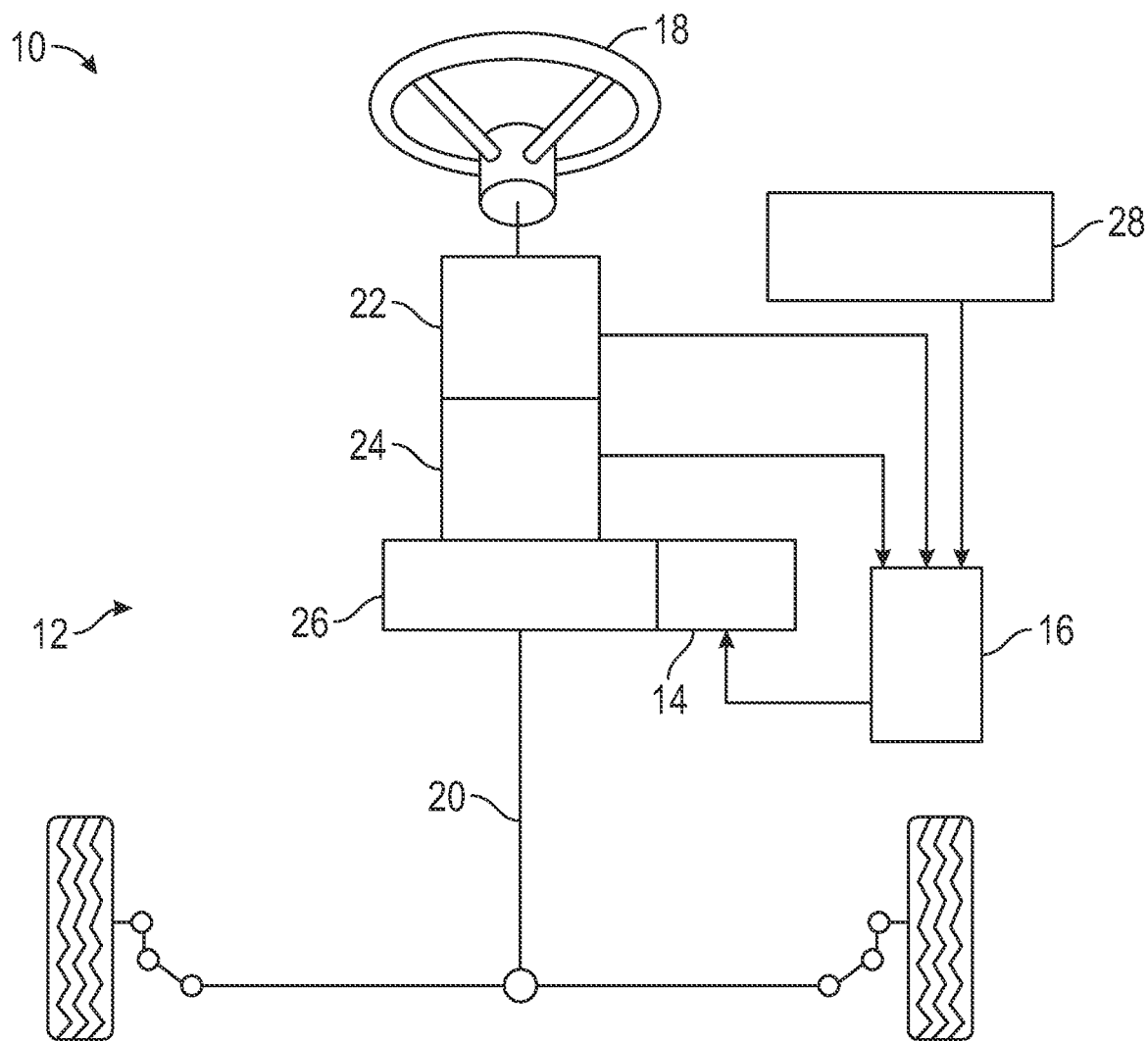
FIG. 1 depicts a schematic diagram of an electric power steering (EPS) system of a vehicle according to one or more embodiments of the present disclosure.

Aspects of the present disclosure relates to lower rotor assemblies and, more particularly, a lower rotor assembly for a torque sensor in an electric power steering (EPS) system of a vehicle. FIG. 1 depicts a schematic diagram of an electric power steering (EPS) system of a vehicle according to one or more embodiments of the present disclosure. As shown in FIG. 1, the EPS system 10 may include a steering mechanism 12, a motor 14 assembled to the steering mechanism 12, and an electronic control unit (ECU) 16 in electronic communications with the steering mechanism 12 and the motor 14.

Specifically, the steering mechanism 12 may include a steering wheel 18 connected to a steering shaft 20 of the EPS system. An operator of the vehicle may control a direction of the vehicle by steering the steering wheel 18 (i.e. by applying a steering torque input to the steering wheel 18). The steering mechanism 12 may further include a steering angle sensor 22 provided on the steering shaft 20 and configured to detect a rotation angle of the steering wheel 18 when the operator steers the steering wheel 18. The steering mechanism 12 may also include a torque sensor 24 provided on the steering shaft 20 and configured to detect the steering torque input applied to the steering wheel 18 by the operator of the vehicle. The steering mechanism 12 may further include a reduction gear 26 provided on the steering shaft 20 and configured to reduce a rotational speed of the steering shaft 20 (i.e. reduce the steering torque input required from the operator).

Referring to FIG. 1, the motor 14 may be assembled to the reduction gear 26 of the steering mechanism 12. The motor 14 may rotate the reduction gear 26 with an assist force that reduces the steering torque input required from the operator to assist with the manual steering effort required for steering maneuvers.

Further, as shown in FIG. 1, the ECU 16 may be in electronic communications with the steering mechanism 12. As such, the ECU 16 may receive data from the steering mechanism 12. Specifically, the ECU 16 may receive data regarding the rotation angle of the steering wheel 18 from the steering angle sensor 22, and may further receive data regarding the steering torque input provided by the operator from the torque sensor 24. In addition, the ECU 16 may electronically communicate with a vehicle speed sensor 28 which detects a speed of the vehicle when the vehicle is in operation. The ECU 16 may thus receive data regarding the speed of the vehicle from the vehicle speed sensor 28. Based on all the data received from the steering angle sensor 22, the torque sensor 24, and the vehicle speed sensor 28, the ECU 16 may then calculate an assist force to be applied to the reduction gear 26 so as to reduce the steering torque input required from the operator.

While the illustrated embodiments show a column electric power steering (CEPS) system, where the electromechanical assistance is provided to a portion of the column structure, it is to be appreciated that the embodiments disclosed herein may be applicable to a rack electric power steering (REPS) system, where the electromechanical assistance is provided to a steering rack. Additionally, the embodiments disclosed herein may be used with a steer-by-wire steering system or a system having a mechanical connection between the steering input and the steering output.

Figure 2:
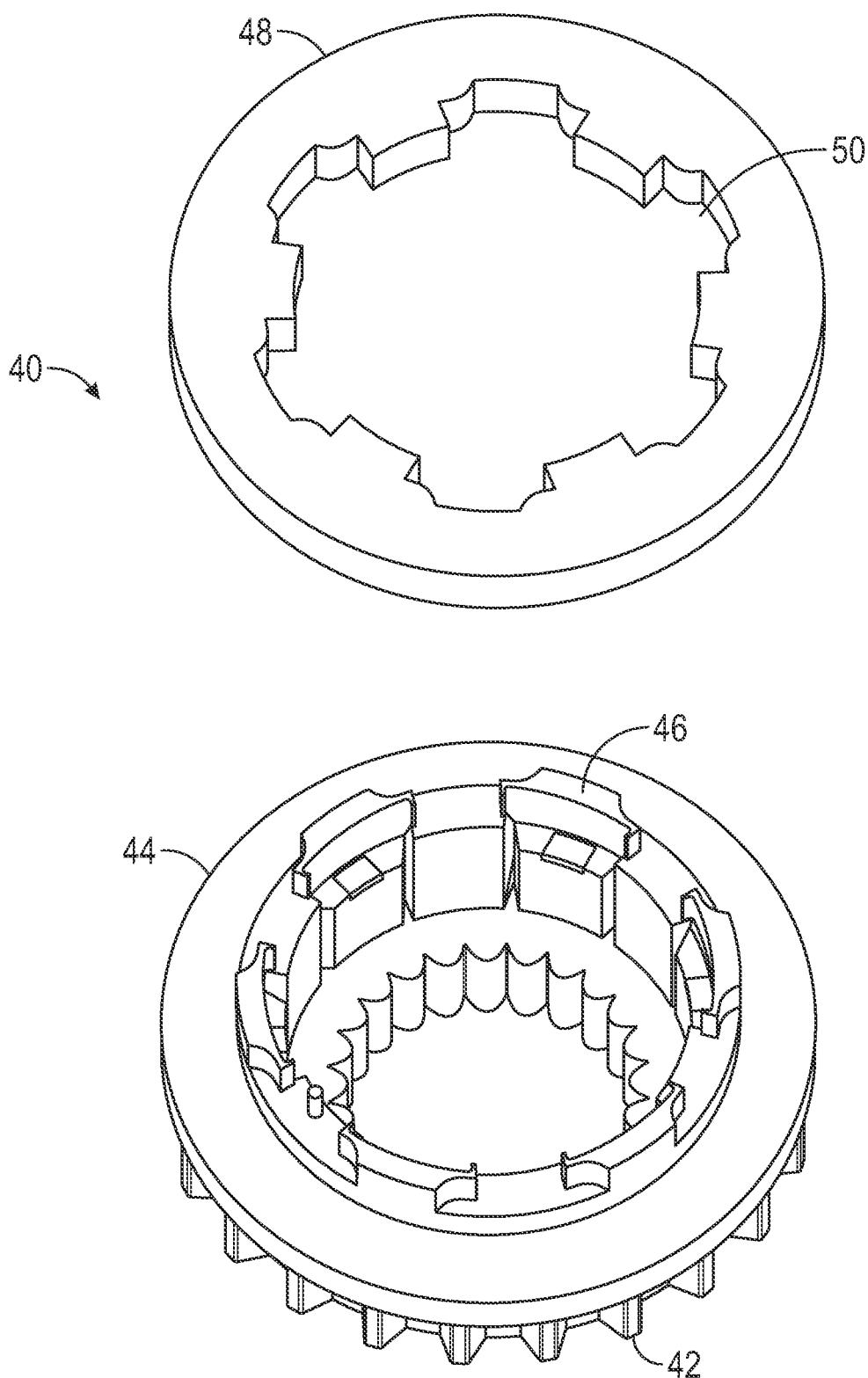
FIG. 2 shows a lower rotor assembly for a torque sensor according to a first embodiment of the present disclosure.

FIG. 2 shows a lower rotor assembly for a torque sensor according to a first embodiment of the present disclosure. The torque sensor may be the torque sensor as described in FIG. 1, which may be used in an EPS system of a vehicle to detect a steering torque input to a steering wheel by an operator of the vehicle. Referring to FIG. 2, the lower rotor assembly 40 includes a lower rotor over-mold 42 and a lower stator 44 integrally formed with the lower rotor over-mold 42. The lower stator 44 may be integrally formed with the lower rotor over-mold 42 as a single, unitary component. The lower rotor over-mold 42 may include at least one heat staking structure 46 extending from an upper surface of the lower rotor over-mold 42. The heat staking structure 46 may be a heat staking rib or post. The heat staking structure 46 may be formed of plastic.

As shown in FIG. 2, the lower rotor assembly 40 may further include an upper stator 48 independent to (i.e., a structurally separate component) the lower stator 44. The upper stator 48 may be assembled to the lower stator 44. Specifically, the upper stator 48 may include at least one receiving structure 50, wherein each receiving structure receives a respective heat staking structure 46 of the lower rotor over-mold 42 when the upper stator 48 is coupled to the lower stator 44.

After the upper stator 48 is coupled to the lower stator 44, a heat staking process may be employed to secure (e.g. mount) the upper stator 48 to the lower stator 44. When heat is applied to the at least one heat staking structure 46 of the lower rotor over-mold 42, the at least one heat staking structure 46 may reform in shapes, thereby joining the upper stator 48 with the lower rotor over-mold 42, and thus with the lower stator 44.

Figure 3:
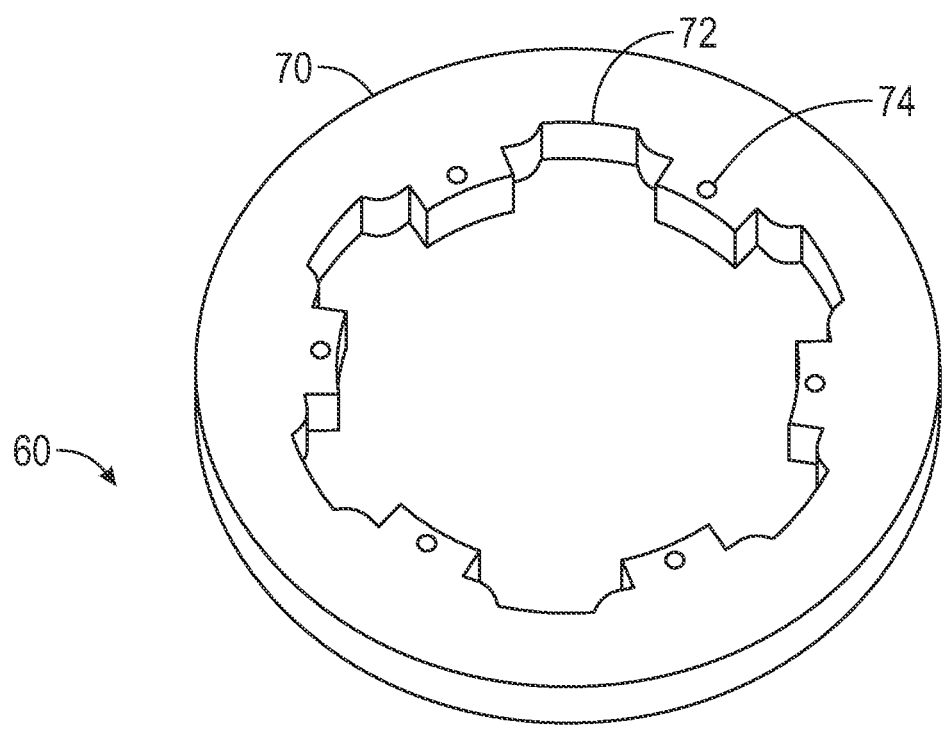
FIG. 3 shows a lower rotor assembly for a torque sensor according to a second embodiment of the present disclosure.
Figure 3:
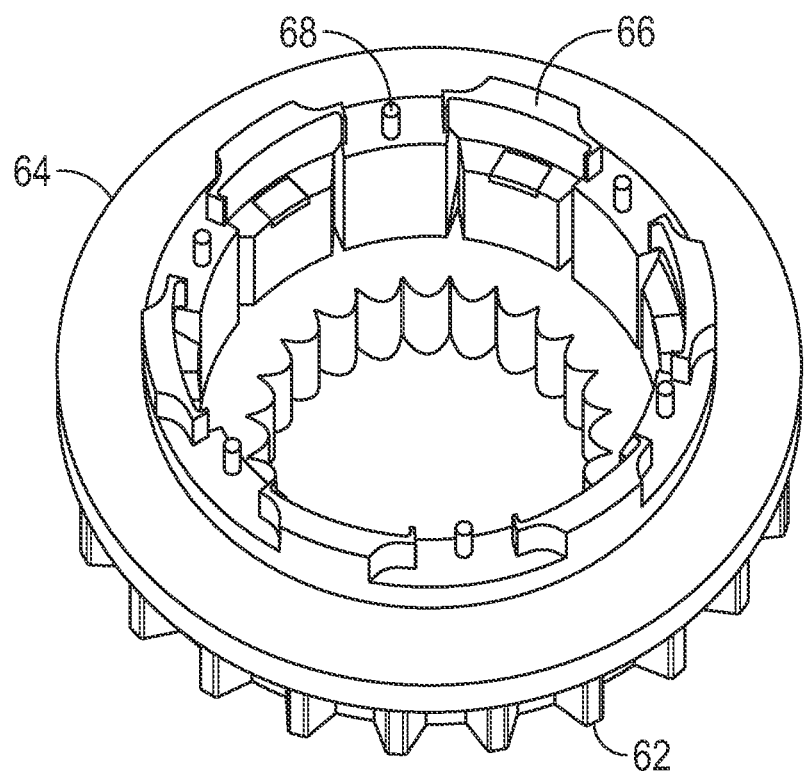

FIG. 3 shows a lower rotor assembly for a torque sensor according to a second embodiment of the present disclosure. The torque sensor may be the torque sensor as described in FIG. 1, which may be used in an EPS system of a vehicle to detect a steering torque input to a steering wheel by an operator of the vehicle. Referring to FIG. 3, the lower rotor assembly 60 includes a lower rotor over-mold 62 and a lower stator 64 integrally formed with the lower rotor over-mold 62. The lower stator 64 may be integrally formed with the lower rotor over-mold 62 as a single, unitary component. The lower rotor over-mold 62 may include at least one first heat staking structure 66 extending from an upper surface of the lower rotor over-mold 62. The first heat staking structure 66 may be a heat staking rib. The first heat staking structure 66 may be formed of plastic. The lower rotor over-mold 62 may further include at least one second heat staking structure 68 extending from the upper surface of the lower rotor over-mold 62. The second heat staking structure 68 may be a heat staking post different from the first heat staking structure 66. The second heat staking structure 68 may be formed of plastic. The at least one first and second heat staking structures, 66 and 68, may be positioned on the upper surface of the lower rotor over-mold 62 in an alternating manner.

As shown in FIG. 3, the lower rotor assembly 60 may further include an upper stator 70 independent to (i.e., a structurally separate component) the lower stator 64. The upper stator 70 may be assembled to the lower stator 64. Specifically, the upper stator 70 may include at least one first receiving structure 72, wherein each first receiving structure receives a respective first heat staking structure 66 of the lower rotor over-mold 62 when the upper stator 70 is coupled to the lower stator 64. In addition, the upper stator 70 may further include at least one second receiving structure 74, wherein each second receiving structure receives a respective second heat staking structure 68 of the lower rotor over-mold 62 when the upper stator 70 is coupled to the lower stator 64. The second receiving structure 74 may be through holes defined by the upper stator 70.

After the upper stator 70 is coupled to the lower stator 64, a heat staking process may be used to secure (e.g. mount) the upper stator 70 to the lower stator 64. When heat is applied to the at least one first and second heat staking structures, 66 and 68, of the lower rotor over-mold 62, the at least one first and second heat staking structures, 66 and 68, may reform in shapes, thereby joining the upper stator 70 with the lower rotor over-mold 62, and thus with the lower stator 64.

Figure 4:
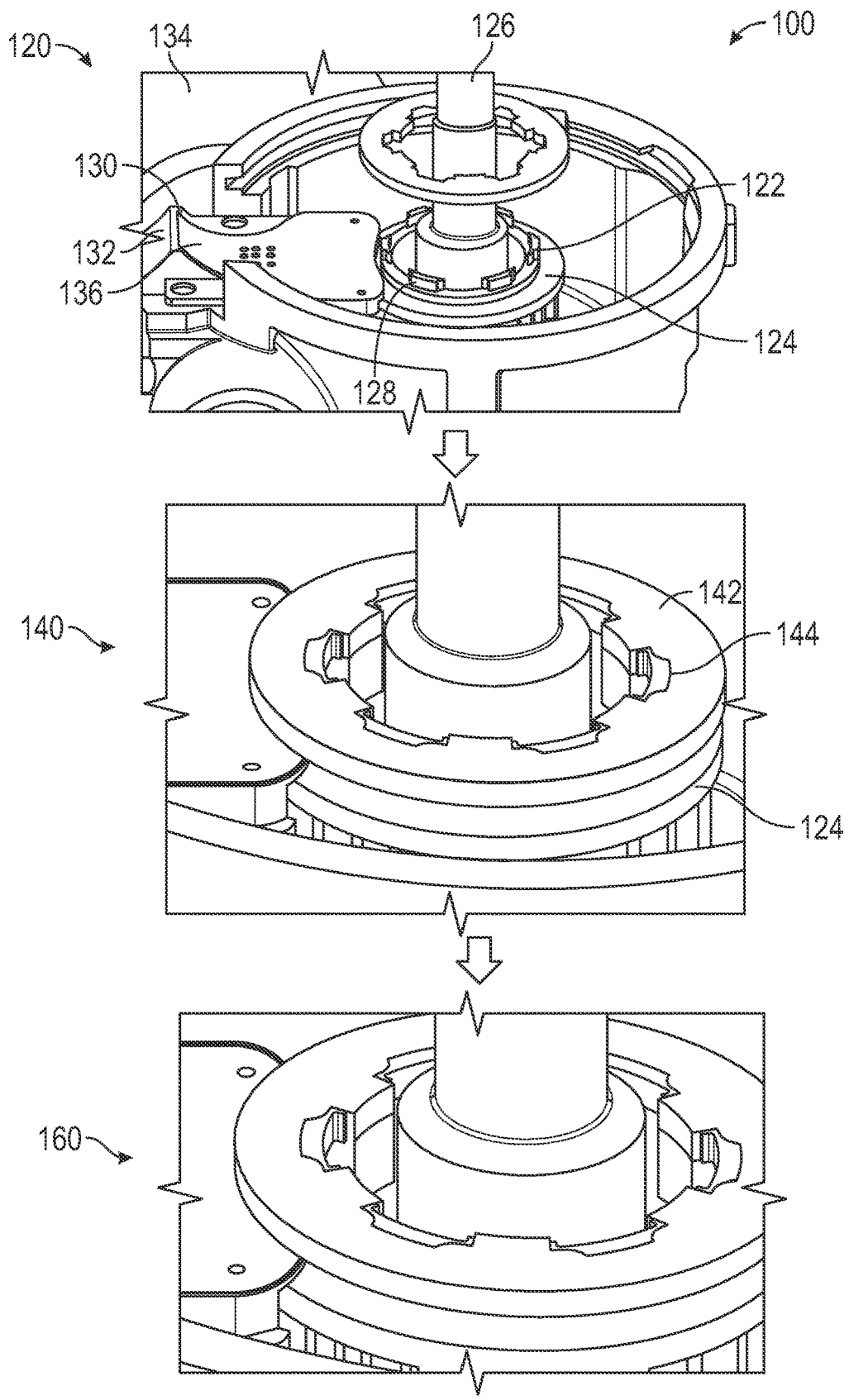
FIG. 4 depicts steps associated with a method of assembling a lower rotor assembly for a torque sensor according to a first embodiment of the present disclosure.

FIG. 4 depicts steps associated with a method of assembling a lower rotor assembly for a torque sensor according to a first embodiment of the present disclosure. The torque sensor may be the torque sensor as described in FIG. 1, which may be used in an EPS system of a vehicle to detect a steering torque input to a steering wheel by an operator of the vehicle.

At stage 120, the method 100 may include pressing a lower rotor over-mold 122 and a lower stator 124 integrally formed therewith together to a shoulder of a lower assist shaft 126 of the EPS system. The lower stator 124 may be integrally formed with the lower rotor over-mold 122 as a single, unitary component. The lower rotor over-mold 122 may include at least one heat staking structure 128 extending from an upper surface of the lower rotor over-mold 122. The heat staking structure 128 may be a heat staking rib or post. The heat staking structure 128 may be formed of plastic. The method 100 may then include placing a probe housing assembly (PHA) 130 onto a surface of the lower stator 124 when the lower stator 124 and the lower rotor over-mold 122 are positioned at the shoulder of the lower assist shaft 126 of the EPS system. The PHA 130 may include a plastic member 132 mountable to an assist housing 134 of the EPS system. The PHA 130 may further include a printed circuit board (PCB) 136 coupled to the plastic member 132. The method 100 may then include mounting the PHA 130 to the assist housing 134 of the EPS system. In some embodiments, the PHA 130 may be mounted to the assist housing 134 using screws or the like.

At stage 140, the method 100 may include coupling an upper stator 142 onto the lower stator 124. The upper stator 142 may include at least one receiving structure 144, wherein each receiving structure receives a respective heat staking structure 128 of the lower rotor over-mold 122 when the upper stator 142 is coupled to the lower stator 124.

At stage 160, the method 100 may include heating the at least one heat staking structure 128 of the lower rotor over-mold 122. Upon heating, the at least one heat staking structure 128 may reform in shapes, thereby joining the upper stator 142 with the lower rotor over-mold 122, and thus with the lower stator 124. The method 100 may further include cooling the lower rotor over-mold 122, the lower stator 124, and the upper stator 142, resulting in the assembling of the lower rotor assembly.

Figure 5:
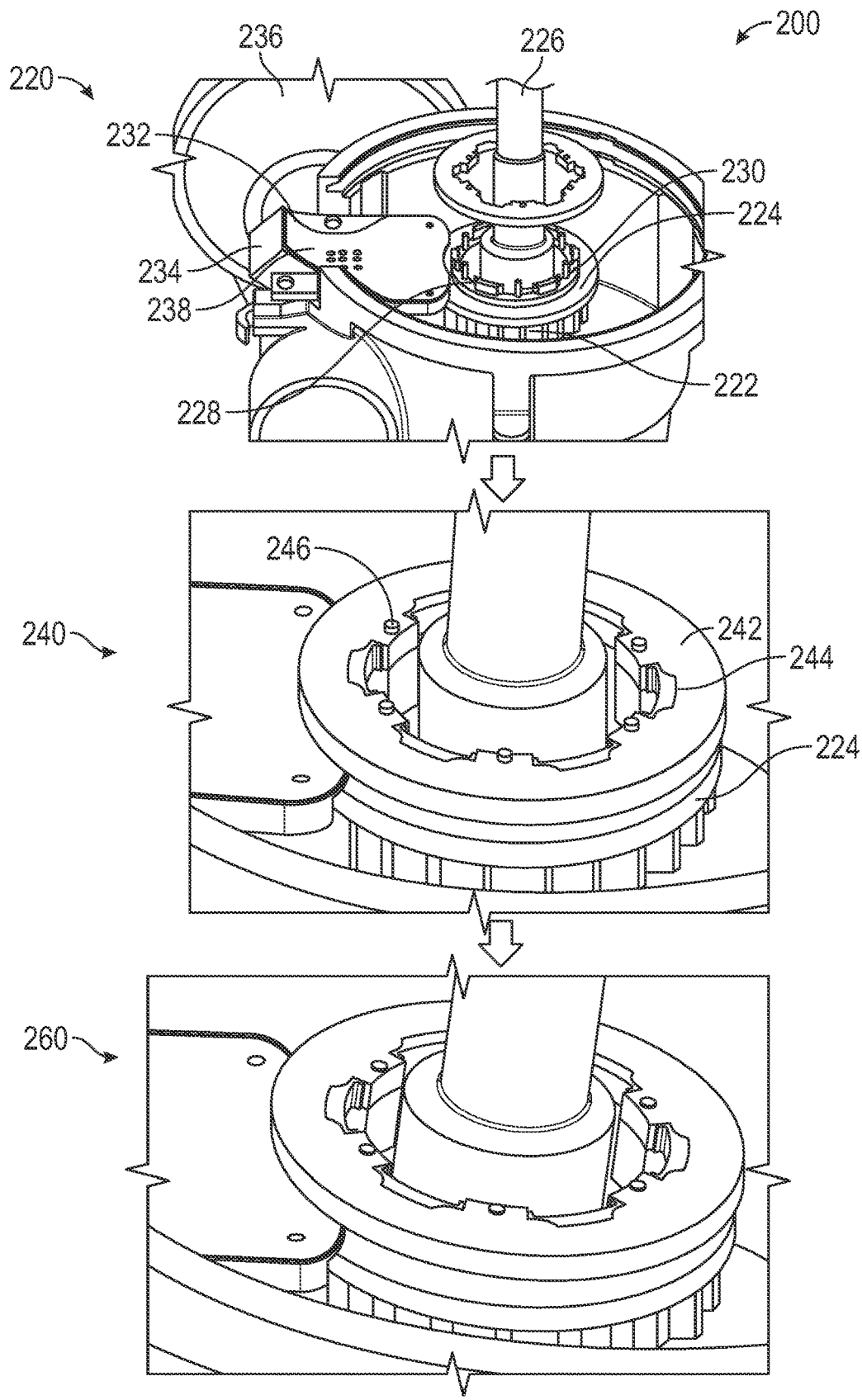
FIG. 5 depicts steps associated with a method of assembling a lower rotor assembly for a torque sensor according to a second embodiment of the present disclosure.

FIG. 5 depicts steps associated with a method of assembling a lower rotor assembly for a torque sensor according to a second embodiment of the present disclosure. The torque sensor may be the torque sensor as described in FIG. 1, which may be used in an EPS system of a vehicle to detect a steering torque input to a steering wheel by an operator of the vehicle.

At stage 220, the method 200 may include pressing a lower rotor over-mold 222 and a lower stator 224 integrally formed therewith together to a shoulder of a lower assist shaft 226 of the EPS system. The lower stator 224 may be integrally formed with the lower rotor over-mold 222 as a single, unitary component. The lower rotor over-mold 222 may include at least one first heat staking structure 228 extending from an upper surface of the lower rotor over-mold 222. The first heat staking structure 228 may be a heat staking rib. The first heat staking structure 228 may be formed of plastic. The lower rotor over-mold 222 may further include at least one second heat staking structure 230 extending from the upper surface of the lower rotor over-mold 222. The second heat staking structure 230 may be a heat staking post different from the first heat staking structure 228. The second heat staking structure 230 may be formed of plastic. The at least one first and second heat staking structures, 228 and 230, may be positioned on the upper surface of the lower rotor over-mold 222 in an alternating manner. The method 200 may then include placing a probe housing assembly (PHA) 232 onto a surface of the lower stator 224 when the lower stator 224 and the lower rotor over-mold 222 are positioned at the shoulder of the lower assist shaft 226 of the EPS system. The PHA 232 may include a plastic member 234 mountable to an assist housing 236 of the EPS system. The PHA 232 may further include a printed circuit board (PCB) 238 coupled to the plastic member 234. The method 200 may then include mounting the PHA 232 to the assist housing 236 of the EPS system. In some embodiments, The PHA 232 may be mounted to the assist housing 236 using screws or the like.

At stage 240, the method may include coupling an upper stator 242 onto the lower stator 224. The upper stator 242 may include at least one first receiving structure 244, wherein each first receiving structure receives a respective first heat staking structure 228 of the lower rotor over-mold 222 when the upper stator 242 is coupled to the lower stator 224. The upper stator 242 may further include at least one second receiving structure 246, wherein each second receiving structure receives a respective second heat staking structure 230 of the lower rotor over-mold 222 when the upper stator 242 is coupled to the lower stator 224. The second receiving structure 246 may be through holes defined by the upper stator 242.

At stage 260, the method 200 may include heating the at least one first and second heat staking structures, 228 and 230, of the lower rotor over-mold 222. Upon heating, the at least one first and second heat staking structures, 228 and 230, may reform in shapes, thereby joining the upper stator 242 with the lower rotor over-mold 222, and thus with the lower stator 224. The method 200 may further include cooling the lower rotor over-mold 222, the lower stator 224, and the upper stator 242, resulting in the assembling of the lower rotor assembly.

In view of FIGS. 4 and 5, because the PHA (130 in FIG. 4 or 232 in FIG. 5) is placed onto the lower stator after the lower stator and the lower rotor over-mold are pressed to the shoulder of the lower assist shaft of the EPS system, an air gap between the PHA and the lower rotor is therefore easy to be measured, and a press load of the PHA is also easy to be detected.

Although the one or more embodiment described herein employs a heat staking process to assemble the lower rotor assembly, it is contemplated that the lower rotor assembly may be assembled using other methods known by a person skilled in the art.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A lower rotor assembly for a torque sensor, the lower rotor assembly comprising:
    a lower rotor over-mold including at least one first heat staking structure extending from an upper surface thereof and at least one second heat staking structure extending from the upper surface thereof, wherein the at least one first heat staking structure is a plurality of heat staking ribs, wherein the at least one second heat staking structure is a plurality of heat staking posts, wherein the heat staking ribs and the heating staking posts are arranged in an alternating manner around the lower rotor over-mold;
    a lower stator integrally formed with the lower rotor over-mold as a single, unitary component; and
    an upper stator including:
        at least one first receiving structure, wherein each first receiving structure receives a respective first heat staking structure of the lower rotor over-mold when the upper stator is coupled to the lower stator; and
        at least one second receiving structure, wherein each second receiving structure receives a respective second heat staking structure of the lower rotor over-mold when the upper stator is coupled to the lower stator.

2. The lower rotor assembly of claim 1, wherein the at least one first heat staking structure is formed of plastic.

3. The lower rotor assembly of claim 1, wherein the at least one second heat staking structure is formed of plastic.

4. The lower rotor assembly of claim 1, wherein the at least one first and second heat staking structures are positioned on the upper surface of the lower rotor over-mold in an alternating manner.

5. A method of assembling a lower rotor assembly for a torque sensor of an electric power steering (EPS) system, the method comprising:
    pressing a lower rotor over-mold and a lower stator integrally formed therewith together to a shoulder of a lower assist shaft of the EPS system, the lower rotor over-mold including at least one first heat staking structure extending from an upper surface thereof and at least one second heat staking structure extending from the upper surface thereof, wherein the at least one first heat staking structure is a plurality of heat staking ribs, wherein the at least one second heat staking structure is a plurality of heat staking posts, wherein the heat staking ribs and the heating staking posts are arranged in an alternating manner around the lower rotor over-mold;
    placing a probe housing assembly (PHA) onto a surface of the lower stator when the lower stator and the lower rotor over-mold are positioned at the shoulder of the lower assist shaft of the EPS system;
    mounting the PHA onto an assist housing of the EPS system;
    coupling an upper stator onto the lower stator, the upper stator including at least one first receiving structure, wherein each first receiving structure receives a respective first heat staking structure of the lower rotor over-mold when the upper stator is coupled to the lower stator;
    heating the at least one first heat staking structure of the lower rotor over-mold to join the upper stator with the lower rotor over-mold; and
    cooling the lower rotor over-mold, the lower stator, and the upper stator, resulting in the assembling of the lower rotor assembly.

6. The method of claim 5, wherein the lower stator is integrally formed with the lower rotor over-mold as a single, unitary component.

7. The method of claim 5, wherein the at least one first heat staking structure is formed of plastic.

8. The method of claim 5, wherein the at least one second heat staking structure is formed of plastic.

9. The method of claim 5, wherein the upper stator further includes at least one second receiving structure, wherein each second receiving structure receives a respective second heat staking structure of the lower rotor over-mold when the upper stator is coupled to the lower stator.

10. The method of claim 9, wherein the at least one second receiving structure is a through hole defined by the upper stator.

11. The method of claim 5, wherein the PHA includes a plastic member mountable to the assist housing of the EPS system.

12. The method of claim 11, wherein the PHA further includes a printed circuit board (PCB) coupled to the plastic member.

* * * * *